Aug. 8, 1939.   B. W. TWYMAN   2,168,659
STEERING GEAR
Filed Aug. 27, 1937
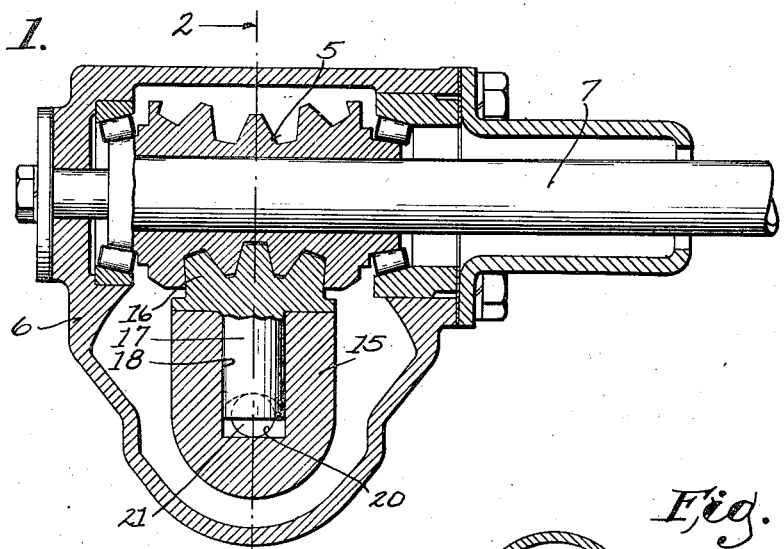
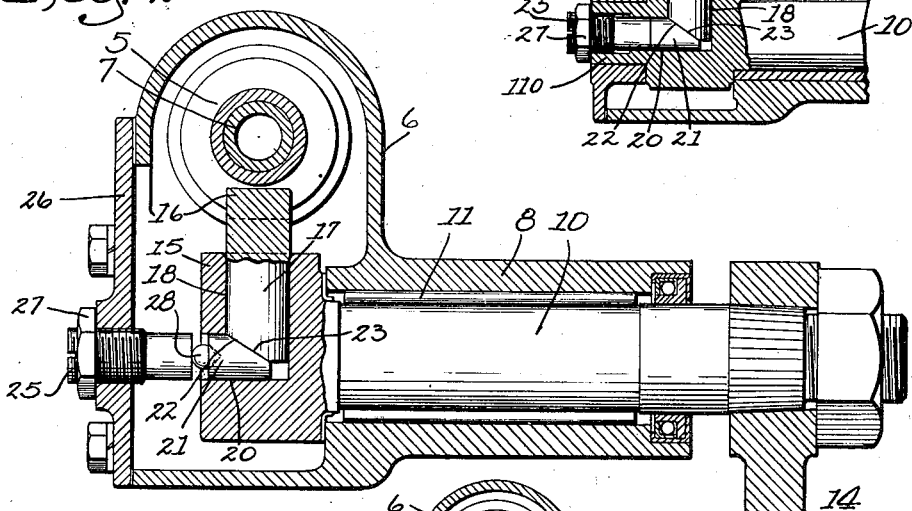
INVENTOR
B. Wickliffe Twyman,
BY
Wheeler, Wheeler & Wheeler.
ATTORNEYS Patented Aug. 8, 1939

2,168,659

UNITED STATES PATENT OFFICE 2,168,659

STEERING GEAR

B. Wickliffe Twyman, Milwaukee, Wis., assignor to Lavine Gear Company, Milwaukee, Wis., a corporation of Wisconsin Application August 27, 1937, Serial No. 161,233

15 Claims. (Cl. 74—497)

This invention relates to improvements in steering gears.

Eccentric bushings have heretofore been provided either for the worm cam or the rock shaft of a steering gear where adjustments to compensate for wear are desired. These constructions have been open to many objections and have failed also to achieve numerous advantages which are available in the use of the present invention.

It is the primary object of the invention to provide novel and improved means for adjusting a cam follower with respect to the worm cam, with particular reference to compensation for wear. There are, however, a number of other advantages of the present invention including the easier heat treatment of the parts, compensation for unavoidable pitch variation in the hour glass type of gear or worm cam, ease and delicacy of adjustment without disassembling the gear and without expensive apparatus, and also the cushioning of the gear and rendering it soft, preventing it from wandering and rendering it measurably self-correcting.

Other objects will appear from the following disclosure.

In the drawing:

Figure 1 is a view axially of the steering shaft through a steering gear embodying the present invention.

Figure 2 is a view transversely through the gear shown in Fig. 1 in the plane indicated at 2—2 in Fig. 1.

Figure 3 is a view on reduced scale taken on the same section as that indicated in Fig. 2 but showing a modified embodiment of the invention.

Figure 4 is a further view on reduced scale similar to Fig. 2 but showing a further modification of the invention.

Like parts are identified by the same reference characters throughout the several views.

In a broad sense the type of steering gear employing an hour glass worm is purely illustrative of one application of the invention. In a more restricted sense, however, the invention has particular utility as applied to this type of steering gear. As best shown in Fig. 1 and Fig. 2, the hour glass gear or worm cam 5 is provided with suitable bearings mounting it in a generally conventional case 6 into which the steering shaft 7 projects into operative driving connection with the hour glass worm cam 5.

The case has a tubular extension 8 in which the rock shaft 10 is journaled preferably either in needle bearings 11 or in a plain bushing 12 as shown in Figs. 2 and 3 respectively. Externally of the gear case the rock shaft 10 carries conventional rocker arm 14 by means of which motion is transmitted to the steering wheels of the vehicle. Within the case the rock shaft has an oppositely projecting arm 15 which, in the conventional steering gear, is integrally provided with a cam follower of a form to mesh with the hour glass worm gear at 5.

According to the present invention the cam follower 16 comprises a separate element mounted on a post 17 with which it may be integral and which is radially reciprocable in the bore 18 in arm 15, the degree of mesh of the cam follower 16 with the worm cam 5 depending on the height of the post 17 in said bore.

Intersecting the bore 18 is another and preferably smaller bore at 20 in which is disposed a cylindrical adjusting element 21 beveled at 22 for engagement with the correspondingly beveled extremity 23 of post 17. The adjusting pin 21 is preferably movable in a direction axially of rock shaft 10 in bore 20 under the thrust of a set screw 25 which, in the embodiment shown in Fig. 1 and Fig. 2, is threaded into the closure plate 26 and may be anchored in any adjustment by the conventional lock nut at 27.

It is broadly immaterial whether the pressure of the set screw 25 is transmitted directly to the adjusting pin 21, but I prefer to interpose the ball 28 as shown in Fig. 2 in order to compensate for any slight irregularity of alignment and regardless thereof to permit of the fine and delicate adjustment of the parts.

The thrust reaction between the hour glass worm gear 5 and the cam follower 16 tends to thrust the cam follower radially from the worm and to cause it to be received telescopically into the bore 18 of the rock shaft arm 15. This thust is resisted by engagement of the beveled surfaces 22 and 23. If the set screw 25 is tight, the cam follower may be forced, by engagement of the beveled surfaces 22 and 23, into intimate pressure engagement with the worm cam in such a way as to render the action of the gear very stiff. If the set screw is not turned up so tightly, a very delicate adjustment can be secured in which the cam follower will mesh with the worm cam without any play and yet without any undue stiffness. The most minute compensation for wear may be made by loosening the lock nut and turning up the set screw slightly. It is a great advantage to have an arrangement in which the set screw may be mounted on a closure plate 26 to be accessible from the exterior of the casing without any direct connection with the rock shaft.

Yet there may be circumstances in which adjustment directly with reference to the rock shaft 10 may be desired. In such instance the rock shaft may conveniently be extended and provided with a bearing in the closure plate 260 as shown at 110. The set screw 25 may be threaded directly into the extended terminal portion 110 of the rock shaft and the lock nut 27 may be engaged with such terminal rock shaft portion. Fig. 3 also shows how the parts appear when no ball is interposed between the set screw 25 and the adjusting pin 21 as at 28 in Fig. 2.

The construction shown in Fig. 4 is, in many respects, preferred, as it introduces an element of cushioning, softness, and self-compensation, over and above the advantages achieved in the other constructions already described.

In the Fig. 4 construction that portion of the bore 200 which underlies bore 18 may conveniently be filled with rubber or the like which, as is well known, is relatively incompressible but has under pressure many of the properties of a liquid. The end of bore 200 is closed by a plug 210, the end of which is preferably roughened so that its rotative position will be fixed by the rubber insert 200 against relative rotation such as might destroy the rubber cushion. The plug of piston 210 is engaged by the set screw 250 with or without the intervention of a ball as at 28 in Fig. 2. The set screw is shown to be threaded directly into the closure plate 26 in the manner disclosed in Fig. 2.

When the set screw 250 is tightened its pressure will be transmitted through the plug or piston 210 to the rubber mass or cushion 30 which underlies the post 170 upon which the cam follower 16 is mounted. Since the pressure is transmitted through the rubber in all directions, as through a liquid, the displacement rubber transfers the pressure to the plunger 170 and thence to the cam follower 16, virtually without loss.

It will be understood that the fit between every hour glass worm cam and cam follower is a compromise due to radius variations. The very slight compressibility of the rubber, however, and its elasticity for expansion when pressure is relieved, causes the rubber to expand and to yield slightly between either extreme of movement of the worm cam and the central position thereof to maintain the cam follower in intimate contact with the worm cam in all positions, and to compensate for deviation in the degree of mesh which would otherwise occur between the center and the extremes of the steering range. Thus binding is eliminated and undue looseness is also eliminated and the gear has a velvety action throughout its range.

Furthermore, the rubber, even without appreciable compression, has the power of damping shock of low frequency and consequently the fact that this rubber cushion is interposed in the connections eliminates vibration in addition to softening the functioning of the steering gear and enabling it to be made self-correcting without any tendency to "wander".

The frictional sliding bearing between the surface 22 and 23 of the adjusting pin 21 and the post 17 likewise has, to a lesser degree, a tendency to soften the functioning of the gear and enable it to be made self-correcting without wandering.

In a sense each of the several devices disclosed transmits pressure axially of the rock shaft from the exterior of the gear casing through a displacement body to extrude the cam follower element radially of the rock shaft for the purpose of adjusting its degree of mesh with the worm cam with a greater or less degree of positiveness. In each instance the fact that the adjustment is a single external adjustment is of the greatest advantage from the standpoint of simplicity and economy.

The use of a ball at 28 reduces the amount of machining which would otherwise be required, but the use of a rubber cushion or equivalent at 30 still further minimizes the machining since it is not even necessary, in this construction, to machine the ends of the piston 210 or the post 170.

While only rubber has been specifically referred to, it will of course be understood that there are available on the market a number of rubber substitutes and most of these, as well as many liquids, if properly confined, will transmit motion with substantially the same characteristics as those sought in the use of rubber.

In all constructions disclosed a great deal of economy is effected by reason of the fact that only the cam follower and its supporting post need be made of tool steel or hardened. The rest of the rock shaft can be made of softer metal. Thus a great deal of expense in the purchase of materials and the treatment thereof and avoidance of loss is saved by the present invention.

I claim:

1. A steering gear comprising the combination with a worm cam, of a rock shaft provided with a cam follower adjustable substantially radially of the rock shaft into thrust engagement with the worm cam, and means comprising a compressed rubber cushion and means confining said cushion under compression for maintaining the adjusted position of the cam follower with respect to the rock shaft.

2. In a steering gear, the combination with a socketed rock shaft and a worm cam, of a post in the socket, a cam follower caried by the post and meshing with the worm cam, and means comprising a compressed elastically deformable cushion substantially fitting the socket and bearing against the post for adjusting said post radially of the rock shaft whereby to control the mesh of said follower with said worm cam.

3. In a steering gear, the combination with a worm cam and a rock shaft provided with a socket, of a post reciprocable in said socket, a cam follower carried by said post and thereby movable with respect to its degree of mesh with the worm cam, and an elastically deformable body in the socket in operative thrust delivering relation to the post.

4. In a steering gear, the combination with an hour glass worm and a rock shaft provided with a socket movable on said shaft through an arc substantially in the plane of the axis of said worm, a post reciprocable in said socket and a heat treated cam follower complementary to the periphery of said worm and mounted on said post in mesh with said worm, together with an axial bore in said rock shaft intersecting said socket, a displacement body in said bore bearing on said post, a plunger reciprocable in the bore, and screw threaded means bearing on said plunger for the axial adjustment thereof, whereby to adjust said cam follower.

5. In a steering gear, the combination with a worm cam, of a rock shaft provided with a substantially radial socket and a substantially axial intersecting bore, a post mounted in said socket and provided with a cam follower meshing with said worm cam, a displacement body in said bore in operative thrust relation to said post, and means adjustable axially of the rock shaft for subjecting said body to pressure for transmission of such pressure through said post to said follower.

6. In a steering gear, the combination with a worm cam, of a rock shaft provided with a substantially radial socket and a substantially axial intersecting bore, a post mounted in said socket and provided with a cam follower meshing with said worm cam, a displacement body in said bore in operative thrust relation to said post, and means adjustable axially of the rock shaft for subjecting said body to pressure for transmission of such pressure through said post to said follower, said post and displacement body having mutually co-acting bearing surfaces, at least one of which is beveled.

7. In a steering gear, the combination with a worm cam, of a rock shaft provided with a substantially radial socket and a substantially axial intersecting bore, a post mounted in said socket and provided with a cam follower meshing with said worm cam, a displacement body in said bore in operative thrust relation to said post, and means adjustable axially of the rock shaft for subjecting said body to pressure for transmission of such pressure through said post to said follower, said displacement body comprising a yieldable substantially incompressible material substantially filling the available space and adapted under compression to transmit motion to said post and follower.

8. In a steering gear, the combination with a worm cam, of a rock shaft provided with a substantially radially extending socket and a substantially axially extending bore, of a post mounted in said socket and provided with a cam follower meshing with said worm cam, a displacement body in said bore in operative pressure transmitting relation to said post, a casing provided with bearings for the support of said worm cam and rock shaft, and an adjusting screw in threaded connection with said casing provided with means for transmitting its pressure to the body in said bore for the adjustment of said follower.

9. In a steering gear, the combination with a worm cam, a cam follower and a rock shaft provided with a socket extending toward said worm cam, of a post movable in said socket and upon which said follower is mounted, a displacement body disposed in said rock shaft below said post, and means screw threaded for movement axially of said rock shaft against said body for the transmission of pressure through said body and post to said follower for the adjustment of its mesh respecting the worm cam.

10. In a steering gear, the combination with a worm cam, a cam follower and a rock shaft provided with a socket extending toward said worm cam, of a post movable in said socket and upon which said follower is mounted, a displacement body disposed in said rock shaft below said post, and means screw threaded for movement axially of said rock shaft against said body for the transmission of pressure through said body and post to said follower for the adjustment of its mesh respecting the worm cam, said screw threaded means being mounted directly in said rock shaft.

11. In a steering gear, the combination with a worm cam, a cam follower and a rock shaft provided with a socket extending toward said worm cam, of a post movable in said socket and upon which said follower is mounted, a displacement body disposed in said rock shaft below said post, and means screw threaded for movement axially of said rock shaft against said body for the transmission of pressure through said body and post to said follower for the adjustment of its mesh respecting the worm cam, said screw threaded means being mounted directly in said rock shaft, said body and post having complementary beveled surfaces.

12. A steering gear comprising the combination with a casing and a worm cam mounted therein, of a rock shaft mounted in said casing and provided with a substantially radial socket movable substantially in the plane of the axis of the worm cam, a post reciprocable in the socket, a cam follower mounted on said post in bearing engagement with the worm cam, a displacement body housed within the rock shaft in thrust engagement with said post, a set screw threaded to said casing and adjustable substantially axially of the rock shaft, and means for transmitting the thrust of said screw to said body and thence through said post to said follower.

13. A steering gear comprising the combination with a casing and a worm cam mounted therein, of a rock shaft mounted in said casing and provided with a substantially radial socket movable substantially in the plane of the axis of the worm cam, a post reciprocable in the socket, a cam follower mounted on said post in bearing engagement with the worm cam, a displacement body housed within the rock shaft in thrust engagement with said post, a set screw threaded to said casing and adjustable substantially axially of the rock shaft, and means for transmitting the thrust of said screw to said body and thence through said post to said follower, said last mentioned means projecting from the end of the rock shaft.

14. A steering gear comprising the combination with a casing and a worm cam mounted therein, of a rock shaft mounted in said casing and provided with a substantially radial socket movable substantially in the plane of the axis of the worm cam, a post reciprocable in the socket, a cam follower mounted on said post in bearing engagement with the worm cam, a displacement body housed within the rock shaft in thrust engagement with said post, a set screw threaded to said casing and adjustable substantially axially of the rock shaft, and means for transmitting the thrust of said screw to said body and thence through said post to said follower, said body comprising the equivalent of a rubber mass confined beneath said post, and said means comprising a plunger for the transmission of pressure from said screw to said mass.

15. A steering gear comprising the combination with a casing and a worm cam mounted therein, of a rock shaft mounted in said casing and provided with a substantially radial socket movable substantially in the plane of the axis of the worm cam, a post reciprocable in the socket, a cam follower mounted on said post in bearing engagement with the worm cam, a displacement body housed within the rock shaft in thrust engagement with said post, a set screw threaded to said casing and adjustable substantially axially of the rock shaft, and means for transmitting the thrust of said screw to said body and thence through said post to said follower, said body comprising the equivalent of a rubber mass confined beneath said post, and said means comprising a plunger for the transmission of pressure from said screw to said mass, said plunger and mass being bonded in mutually non-rotative relation.

B. WICKLIFFE TWYMAN.